Figure 2:
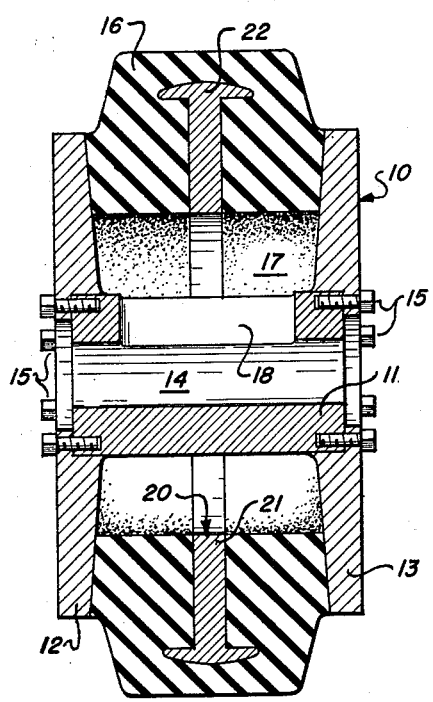

July 13, 1965

R. J. KINDLEY 3,194,293

SHOCK ABSORBING CASTER WHEEL

Filed Jan. 26, 1965

INVENTOR:
Robert J. Kindley
BY

Attorney

United States Patent Office 3,194,293
Patented July 13, 1965

3,194,293
SHOCK ABSORBING CASTER WHEEL
Robert J. Kindley, Albuquerque, N. Mex., assignor, by mesne assignments, to the United States of America as represented by the United States Atomic Energy Commission
Filed Jan. 26, 1965, Ser. No. 429,946
1 Claim. (Cl. 152—327)

This is a continuation-in-part of application Serial No. 236,172, filed November 7, 1962, now abandoned.

The present invention relates generally to caster-type wheels and more particularly to improved such wheels capable of absorbing or mitigating shock and other loads.

Commercially available shock absorbing caster wheels heretofore known employ shock mitigating systems such as spring arrangements, Belleville washers or rubber compression assemblies. These casters are usually provided with a pivoting wheel or horn assembly that rotates upon reception of a shock load for transmitting the load to the shock mitigating system employed. Thus, such casters suffer several shortcomings or disadvantages which tend to lessen their desirability in many applications; for example, these casters are relatively more complex and are normally somewhat heavier than conventional non-shock absorbing casters of the same size and capacity. Also, such casters must be made necessarily larger than the conventional casters in order to accommodate the shock absorbing or shock mitigating system.

The present invention aims to overcome or substantially minimize the aforementioned and other shortcomings and disadvantages of the heretofore known shock absorbing casters by employing a shock mitigating system commensurate with the loads involved and which is in as small and compact package as possible. It is therefore a principal object of the present invention to provide the caster wheel assembly with shock mitigating capabilities without relying on a tension or compression spring arrangement.

Another object of the present invention is to utilize an improved wheel with a rubber-like tire capable of stretching and deforming in shear to provide shock mitigation or shock absorption.

Another object of the present invention is to provide a cavity between a rubber-like tire and a wheel hub for receiving deformed portions of the tire.

A further object of the present invention is to provide the rubber-like tire with an anular ring of metal or other relatively rigid material for distributing loads more uniformly throughout the wheel and tire.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description. The embodiments illustrated are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 1:
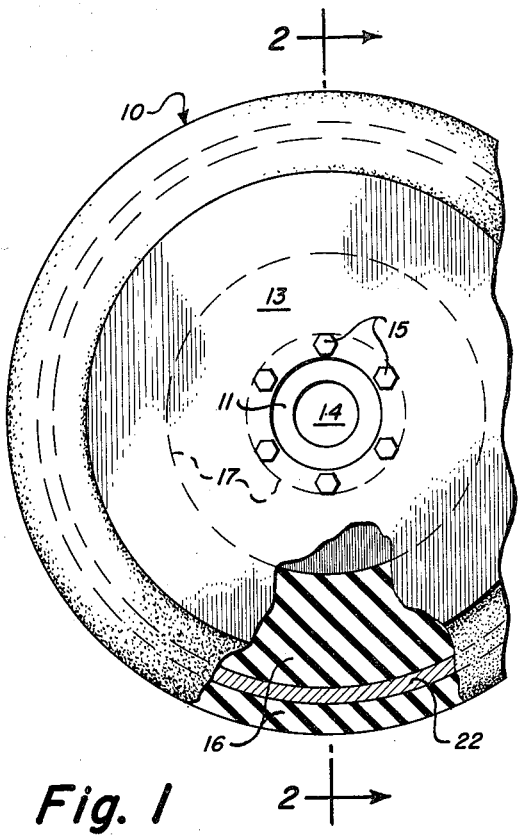
Figure 3:
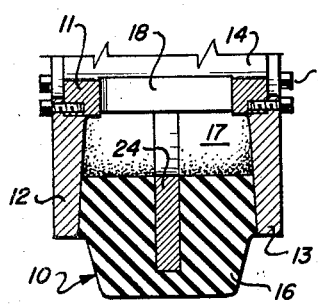
Figure 4:
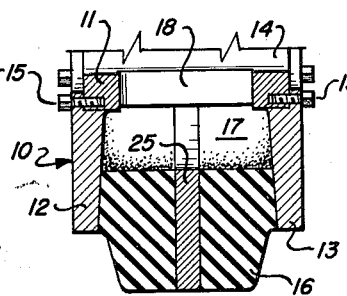
Figure 5:
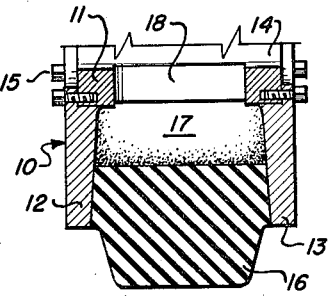

In the accompanying drawing:
FIG. 1 is a fragmentary side elevational view, partly cut away, of a wheel assembly showing one form of the present invention;
FIG. 2 is a sectional view taken along line 2—2 of FIG. 1;
FIG. 3 is a fragmentary sectional view showing another form of the present invention;
FIG. 4 is a fragmentary sectional view showing yet another form of the present invention; and
FIG. 5 is a fragmentary sectional view showing a further form of the present invention.

Referring in more detail to the drawings, the present invention is directed to a caster wheel assembly, generally indicated at 10, which comprises a metal hub 11 having adjacent opposite ends thereof a pair of laterally extending metal flanges 12 and 13. The hub 11 may be provided with an opening 14 therethrough for receiving a supporting shaft (not shown) which may be mounted therein by any suitable bearing structure or arrangement (not shown). The flanges 12 and 13 are annular in form and may be attached to the ends of the hub 11 in any suitable manner, for example, by a bolting arrangement 15, as best illustrated in FIG. 2, welding, or, if desired, by making the hub and the flanges as an integral piece, so as to form an annular groove or channel about the central portion of the hub 11 for receiving an annular rubber-like shock absorbing tire 16 therein. While flanges 12 and 13 are each shown bolted to the hub 11 it will be clear that either flange could be integral with the hub and the other bolted thereto. It may be desirable to provide openings through the flange walls to lighten the wheel assembly.

The shock absorbing tire 16, which is made of an elastomeric material, such as, for example, rubber, having a durometer hardness in the range of about 30 to 90, or a suitable yieldable plastic such as polyurethane, or the like, may be provided with a relatively thick cross-section capable of enjoying a preselected amount of yieldability while at the same time retaining its load supporting properties without excessive deformation. The tire 16 is placed into or formed within the annular channel in such a manner that opposite side faces of the tire each abut an inner surface of a particular flange; the forming could be by injection of the tire material between the flanges and the placing could be after preforming the tire or by building it up with wrapping and curing—these are merely some examples. The tire 16 is preferably bonded to the flanges or supports, or otherwise secured thereto in any other suitable similar manner, so as to prevent relative movement between the flanges and the tire at the interfaces thereof, and where appropriate the inner faces of the flanges would preliminarily coated with a bonding adhesive. The cross-section of the annular tire should be sufficiently thick so that the outer periphery or edge of the annular flanges 12 and 13 lies intermediate the inner and outer peripheries or edges of the tire. With the inner portion of the tire secured to the flanges, it may be desirable to provide the part of the tire extending outwardly beyond the edge of the flanges with an outwardly disposed converging configuration. Thus, as an impact or other load is applied to the outer edge or periphery of the tire 16 it is transmitted into the portion of the tire intermediate the flanges instead of being transmitted directly to the flanges by expanding the outer portion of the tire over the outer edges of the flanges.

When the tire 16 is subjected to a load, the elastomeric material deflects, causing it to stretch and deform in shear and thereby effectively absorb or mitigate the impact or other load. To facilitate such deformation, it has been found that by providing a cavity or volume 17 between the inner edge or periphery of the tire 16 and the hub 11, the tire may readily deform thereinto to substantially minimize the transmission of the impact or other load to the surrounding hub and flanges. The cavity or volume 17 may be of any suitable size or dimension so long as it is capable of receiving the deformed material without excessively restricting the movement thereof, such as by permitting the material to engage the hub during its deformation.

If desired, as mentioned above, the tire may be formed within the channel and bonded to the inner surfaces of the flanges 12 and 13. To achieve this result the hub may be provided with a plurality of mold core openings therethrough, such as indicated at 18 and then the channel 17 filled with molding sand to the cavity size or height desired. The elastomeric material may then be placed about the sand and otherwise molded and vulcanized by using in any suitable procedure which is capable of forming the material in the preferred shape while at the same time effecting a desirable bond between the material and the inner surfaces of the flanges 12 and 13. It may be desirable to slightly roughen, by light sandblasting, acid, or otherwise, the inner surfaces of the flanges to enhance the bonding. After completing the above-mentioned vulcanizing, the sand fill forming the cavity may be withdrawn therefrom through the openings 18 in the hub.

To enhance the load absorbing or shock mitigating action of the elastomeric material, it is preferred to gradually slant or converge the inner walls of the flanges toward the central portion of the hub so that, as the elastomeric material deforms, the gradually converging flanges tend to compress and deflect the material inwardly to maintain it in shear.

In order to enhance distribution of loadings over a greater area of or throughout the tire there is shown securely sandwiched or embedded in the elastomeric material a ring or disc of metal or other substantially rigid material. Impacts or loadings tend to move the material in an upward direction and to similarly move the ring, to thus cause material adjacent the ring to stretch in shear throughout the entire circumference of the ring and tire. Thus the loading is distributed about the entire circumferential area of the elastomeric material adjacent to the ring. The ring is preferably secured to the elastomeric material in some such manner as the previously referred to bonding. It may also be desirable to roughen the surface of the ring as mentioned hereinabove or to place several openings through the sides thereof so as to enhance the bonding and grip between the ring and the material.

While the annular ring may be of any siutable configuration a preferable form is a T-shaped arrangement as shown in FIG. 2. The T-shaped ring generally indicated at 20 comprises a stem portion 21 which may extend outwardly from a point contiguous with the inner edge of the tire 16 to a location in the material beyond the periphery of the flanges, so that it effectively "overlaps" the latter. The relatively large area of the material engaged by the ring is advantageous in that with such a large contacting area the stretching action by the ring on the material when the tire is subjected to an impact or other loading greatly enhances the shock absorbing properties of the tire. Thus, by placing the stem 21 of ring 20 in an overlapping arrangement with the flanges stretching is essentially confined to an area between the flanges so as to insure that the stretching movement of the elastomeric material by the ring deforms the material in shear.

The crossarm 22 of the T-shaped ring 20 may be positioned in the elastomeric material at a location spaced inwardly from the outer periphery of the tire so that when the ring is moved "upwardly" both sides of the crossarm 22 engage the material to stretch and deform the latter, thus providing a substantially greater stretching and deforming action upon the material than would be possible with just the stem 21 alone. It is preferred that the maximum horizontal dimension of crossarm 22 should not be substantially greater than about one-third the spacing between flanges 12 and 13 so as to provide a large area of unobstructed elastomeric material between the crossarm and flanges which will not be damaged by the crossarm itself.

While the above described ring arrangement is particularly advantageous for applications in which the caster wheel may be subjected to heavy loads, there may be other instances in which the caster application is not as critical, thus permitting the use of simpler ring configurations, for example such as shown in FIGS. 3 and 4. With reference to the ring arrangements shown in FIGS. 3 and 4, the rings 24 and 25 respectively, function in a manner similar to the stem 21 of ring 20 (FIG. 2) in their elastomeric material stretching capabilities. In the ring arrangement shown in FIG. 4, the ring 25 bisects the tire 16 so as to enable, if desired, the embedding of the ring in the material to be attained by a different and in some instances a less expensive procedure; for example, the tire 16 may be initially formed in two separate annular sections, each of which may then be securely bonded to the ring by a suitable adhesive or the like.

The form illustrated in FIG. 5 is directed to a caster wheel assembly which does not utilize an annular rigid ring, but which does have side faces of tire and flanges securely bonded to each other in the manner previously noted. While such an arrangement may be considered less desirable than the ring-containing assemblies, it may in some circumstances be felt satisfactory. While this form of wheel assembly may be considered similar to wheel devices heretofore known, such as, for example, that disclosed in United States Patent 994,418, that patent lacks the bonding or otherwise secure interengagement, between tire side faces and the flanges.

The load deflection characteristics of the shock absorbing wheels set forth above may be varied to be adaptable to the particular use contemplated by such selectively changeable factors as the type, yieldability and durometer hardness of the elastomeric material, the width of the tire between the flanges, the thickness and the diameter of the tire, the area of the tire bonded to the flanges, and the size, width and configuration of the annular ring.

It will be seen that the present invention sets forth novel caster wheel assemblies which are capable of providing shock or load absorbing or mitigating properties superior to the conventional heretofore known larger and more complex shock absorbing casters. The caster wheels of the present invention, particularly assemblies containing the annular ring, are capable of protecting, for example, a dolly and its contents from impact loads developed by a free-fall to a hard surface such as concrete, black top or wood floors. By way of example, in one particular instance a twelve inch free-fall was nicely absorbed.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

A shock absorbing caster wheel comprising the combination of a hub, a pair of spaced apart flanges carried by said hub and projecting laterally therefrom and terminating in peripheral portions spaced radially from said hub, a single centrally apertured rigid disc with a widened rim portion at the outermost extremity thereof spaced intermediate and centrally disposed with respect to said flanges and generally parallel thereto with the inner periphery of the disc spaced radially from said hub and with the major portion comprising about two-thirds of the radial width of said disc exclusive of said rim portion positioned radially inwardly with respect to and overlapped by said peripheral portions of the flanges, and only a minor portion comprising about one-third of the radial width exclusive of said rim portion disposed outwardly of said peripheral portions, the maximum horizontal dimensions of said rim portion being not substantially greater than about one-third the spacing between said flanges, and a rubber-like mass of material spaced from said hub filling the spaces between adjacent faces of said flanges and intermediate disc completely embedding said disc except at its innermost periphery and fixedly secured directly to said faces buttressing said disc against substantial movement away from said parallel disposition and assuring that deformation of the rubber-like material by said disc is in shear and is achieved in the mass portions between the flanges.

References Cited by the Examiner

UNITED STATES PATENTS

| | | | |
|---|---|---|---|
| 1,182,297 | 5/16 | Morris | 152—48 |
| 1,402,191 | 1/22 | Thiele | 16—45 |
| 2,393,161 | 1/46 | Haushalter | 152—325 |
| 3,114,408 | 12/63 | Ross | 152—323 |

FOREIGN PATENTS

| | | |
|---|---|---|
| 447,821 | 4/48 | Canada. |
| 534,136 | 2/41 | Great Britain. |

ARTHUR L. LA POINT, *Primary Examiner.*